United States Patent

Anderson et al.

[15] 3,691,121

[45] Sept. 12, 1972

[54] RESOLE VARNISHES PREPARED FROM SUBSTITUTED PHENOLS

[72] Inventors: George J. Anderson, Wilbraham, Mass. 01095; Ronald H. Dahms, Springfield, Mass. 01106

[73] Assignee: Monsanto Company, St. Louis, Mo.

[22] Filed: March 9, 1971

[21] Appl. No.: 122,525

Related U.S. Application Data

[63] Continuation-in-part of Ser. No. 588,310, Oct. 21, 1966, abandoned, and a continuation-in-part of Ser. No. 676,043, Oct. 18, 1967, abandoned, and a continuation-in-part of Ser. No. 738,812, June 21, 1968, abandoned.

[52] U.S. Cl. ........260/29.3, 117/124 E, 117/138.8 A, 117/143 A, 117/155 L, 117/161 L, 161/198, 161/205, 161/227, 161/257, 161/264, 260/31.4 R, 260/32.8 R, 260/33.6 R, 260/51 R, 260/53 R

[51] Int. Cl. ......C09g 5/08, C08g 37/10, C08g 51/34

[58] Field of Search ............................260/29.3, 53 R

[56] References Cited

UNITED STATES PATENTS

| | | |
|---|---|---|
| 2,154,192 | 4/1939 | Zinke ........................260/624 |
| 2,388,583 | 11/1945 | Ward..........................260/619 |
| 2,388,584 | 11/1945 | Ward..........................260/619 |
| 2,423,415 | 7/1947 | Soday........................260/619 |
| 2,444,233 | 6/1948 | Soday........................260/619 |
| 2,824,860 | 2/1958 | Aldridge et al..............260/82 |
| 3,420,915 | 1/1969 | Braithwaite ...............260/837 |
| 3,526,677 | 9/1970 | Dahms et al..............260/53 X |

Primary Examiner—Howard E. Schain
Attorney—John W. Klooster, James C. Logomasini, Richard W. Sternberg and Neal E. Willis

[57] ABSTRACT

The invention relates to resole resin varnishes in largely non-aqueous organic solvents, especially lower alkanols. The resole resins are produced by reacting, under basic aqueous conditions, formaldehyde with a phenol mixture which has been prepared by partial alkylation of phenol with a specific mixture of carbocyclic compounds containing between eight and 13 carbon atoms. The resulting resole resin is then dissolved in organic solvent. The resulting solutions are useful as varnishes in the manufacture of impregnated sheets, laminates, and other reinforced plastics.

9 Claims, No Drawings

RESOLE VARNISHES PREPARED FROM SUBSTITUTED PHENOLS

RELATED APPLICATIONS

This application is a continuation-in-part of our earlier filed U.S. patent applications, Ser. No. 588,310, filed Oct. 21, 1966 now abandoned, Ser. No. 676,043, filed Oct. 18, 1967 now abandoned, and Ser. No. 738,812, filed June 21, 1968 now abandoned.

BACKGROUND

Phenolic varnishes using phenol-aldehyde resole type resins have long been used to impregnate cellulosic and other woven and non-woven materials, especially in fibrous sheet form, and to prepare laminates thereof. However, resole resin varnishes heretofore known when cured have generally suffered from a lack of properties for certain applications, for example, electrical properties, water resistance properties, and mechanical strength properties. Because of these deficiencies, there has been a long felt need in the art of resole resin varnishes for modified phenol-aldehyde resole resins which would overcome one or more of these deficiencies.

One approach to producing modified phenol-aldehyde resins has involved using as starting materials for reaction with aldehydes substituted phenols so as to produce phenol-aldehyde resins having a high molecular weight in proportion to the total amount of phenol used in resin manufacture. The ratio of resole resin prepolymer molecular weight (before curing) to starting phenol content can be termed, for convenience purposes, the PMW efficiency.

In the past, increases in PMW efficiency have been attempted either by using naturally occurring substituted phenols, for example, cresol or cresylic acid, or by using synthetically substituted phenols including naturally occurring drying oils (such as tung oil or oiticica oil), terpenes, and various unsaturated hydrocarbon materials (such as styrene). Phenol-aldehyde resins made from phenols substituted with these starting materials, however, have a plurality of disadvantages. For one thing, the cost of starting materials is so significant that the cost of the resulting phenol-aldehyde resin is increased to the point where it is not competitive with other polymeric materials as respects many use applications. In addition, the resulting phenol-aldehyde product when cured either has an undesirably wide distribution of physical and chemical properties (perhaps caused by using a substituted phenol mixture in which the substituents vary widely from one another structurally), or has an undesirably narrow distribution of physical and chemical properties (perhaps caused by using a substituted phenol in which the substitutents vary only slightly or even not at all from one another structurally). Furthermore, even though the PMW efficiency is improved by using such prior art substituted phenols, the phenolic product resole resins derived therefrom tend to be inferior as respects such properties as storage stability, viscosity, cure rate, or necessity for close manufacturing tolerances.

It has now been discovered that when one reacts an aldehyde with a phenol which has been synthetically substituted with a certain well-defined mixture of $C_8$ through $C_{13}$ carbocyclic compounds, there is produced a phenol-aldehyde resole resin product which has a high PMW efficiency. When such resole resin product is used as the resin component in a varnish, the resulting novel varnish has the capacity, when used in the manufacture of laminates, to produce when thermoset, an excellent combination of electrical, mechanical, and water resistance properties. These varnishes can contain resin solids which are advanceable to a greater extent without forming precipitates from the varnish organic solvent phase than is the case with aqueous solutions of these new phenol-aldehyde resole resin products.

When such substituted phenol-aldehyde (especially one using formaldehyde) resole resin is made into a varnish, such varnish has good storage stability and low viscosity characteristics—properties desirable in phenolic varnishes intended for use in laminate manufacture. Thus, resulting varnishes are useful for impregnating a preformed integral sheet of fibrous cellulosic material, such as cloth, paper, asbestos, and the like, and for making laminates thereof. These end products have generally improved properties heretofore unknown. For example, such a product laminate gives surprisingly and unexpectedly a combination of better electrical, mechanical, water absorption properties than known prior art laminates. Such resole resins themselves, when thermoset, characteristically have surprisingly lower glass transition temperatures than resole resins made, say, from an aldehyde and a substituted phenol, such as cresol.

SUMMARY

This invention is directed to varnishes of certain phenol-aldehyde resole resins in organic solvents. These varnishes are especially adapted for use in the manufacture of impregnated sheet materials and of laminates thereof. The products have high flexural strength, low water absorption and excellent electrical properties. These varnishes display excellent penetration qualities as respects non-woven, sheet-like materials.

The varnishes of this invention comprise:

A. from about 20 to 75 weight percent of a dissolved mixture of a phenol-formaldehyde resole resin,
B. from about 0.5 to 15 weight percent of dissolved water,
C. the balance up to 100 weight percent of any given varnish being an organic liquid which:
  1. is substantially inert (as respects such resin and water,
  2. evaporates below about 150°C. at atmospheric pressures,
  3. is a mutual solvent for said resole resin and said water (if present), the amount of said organic liquid being present in any given varnish being such as to maintain both said resole resin and said water in dissolved form.

The phenol-formaldehyde resole resin employed in the products of this invention has a formaldehyde to phenol mol ratio of from about 0.8 to 2.0 (preferably from about 0.9 to 1.5), and is produced by reacting, in the presence of a basic organic catalyst under liquid aqueous phase conditions, a certain substituted phenol mixture with formaldehyde. The resole resin used in this invention further has a relatively high molecular weight as shown by the fact that it is substantially water-insoluble, but it also has a methanol solubility such that a 60 weight percent solution thereof can be prepared in methanol. Such methanol solution characteristically has a viscosity not greater than about 5,000 centipoises, and preferably this viscosity lies in the range from about 50 to 500 centipoises. In addition, this resin has a free formaldehyde content which is less than about 5 weight percent (based on total dry resin weight).

The substituted phenol mixture used to make such resin is itself prepared by reacting phenol under Friedel-Crafts conditions with a controlled mixture of carbocyclic compounds. The mixture of carbocyclic compounds comprises (on a 100 weight per cent basis when in a form substantially free of other materials):

A. from about 10 through 40 weight percent of compounds each molecule of which has:
 1. the indene nucleus,
 2. from nine through 13 carbon atoms,
 3. as nuclear substituents from 0 through 4 methyl groups,
B. from about 5 through 70 weight percent of compounds each molecule of which has:
 1. the dicyclopentadiene nucleus,
 2. from about 10 through 13 carbon atoms,
 3. as nuclear substituents from 0 through 3 methyl groups,
C. from about 15 through 65 weight percent of compounds each molecule of which has:
 1. a phenyl group substituted by a vinylidene group,
 2. from about eight through 13 carbon atoms,
 3. as substituents from 0 through 3 groups selected from the class consisting of methyl and ethyl,
D. from about 0 through 5 weight percent divinyl benzene,
E. provided that the sum total of all such compounds in any given such mixture of carbocyclic compounds is always 100 weight percent.

At the time when such controlled mixture of carbocyclic compounds is reacted with phenol as indicated, there can be present in such mixture as diluents inert (i.e. as respects reactivity towards phenol under Friedel-Crafts reaction conditions) organic compounds such as aromatic and aliphatic hydrocarbons. Thus, there is present, conveniently, at least about 25 weight percent of diluent in such total combination of mixture of carbocyclic compounds and diluent, although this value is variable depending upon reactants and reaction conditions. While there is no apparent upper limit on the amount of diluent present, it is preferred that the amount of diluent present be not greater than about 95 weight percent (same basis). Preferably, the amount of diluent ranges from about 15 to 70 weight percent (same basis). Up to about 10 weight percent (same basis) of water can be present, but it is preferred to use substantially anhydrous conditions.

Carbocyclic compound mixtures useful in this invention are available commercially from various petroleum producers under a variety of trade names. For example, one suitable carbocyclic compound mixture is available from Enjay Chemical Company under the trade designation "Heart Cut LPD." Another suitable such mixture is available from Monsanto Company, St. Louis, Missouri, under the trade designation "Resin Oil." Still another such mixture is available from the Gulf Oil Company under the trade designation "Resin Former Feed Stock." A presently preferred such mixture is the Monsanto Company "Resin Oil" which is a $C_8$ to $C_{13}$ product cut with a boiling range of from about 300° to 425°F. (150° to about 220°C.) and contains the indicated carbocyclic compound mixture. Shown below in Table I is a breakdown such as is made by vapor phase chromatography showing composition of these three carbocyclic compound mixtures:

TABLE I

| Carbocyclic Compounds | Gulf Oil[2] | Monsanto[3] | Enjay[4] |
|---|---|---|---|
| Vinylidene Aromatics | | | |
| Styrene $C_8$ | 7.6 | 1.4 | 10.1 |
| Alpha-methylstyrene $C_9$ | 1.6 | 2.8 | 2.2 |
| Beta-methylstyrene $C_9$ | 1.5 | 1.6 | 2.1 |
| Vinyltoluene $C_9$ | 4.5 | 17.4 | 10.5 |
| $C_2$ Alkylstyrene[1] $C_{10}$ | 0.9 | 6.2 | 5.8 |
| Divinyl benzene $C_{10}$ | 0.3 | 1.3 | 1.6 |
| Indenes | | | |
| Indene $C_9$ | 12.7 | 17.6 | 12.7 |
| Methylindene $C_{10}$ | 0.3 | 5.5 | 7.6 |
| Cyclopentadienes | | | |
| Isoprene-cyclopentadiene $C_{10}$ | 0.6 | 0.3 | — |
| Dicyclopentadiene $C_{10}$ | 42.7 | 13.9 | 1.1 |
| Methylcyclopentadiene $C_{11}$ | 12.4 | 4.6 | 2.1 |
| Diluents | | | |
| Alkyl Aromatics | | | |
| Benzene $C_6$ | 0.5 | — | 0.1 |
| Toluene $C_7$ | 3.9 | — | 0.8 |
| $C_2$ Alkylbenzene $C_8$ | 7.4 | 0.4 | 12.1 |
| $C_3$ Alkylbenzene $C_9$ | 1.2 | 19.2 | 22.2 |
| $C_4$ Alkylbenzene $C_{10}$ | — | 4.1 | 6.3 |
| Naphthalenes | | | |
| Naphthalene $C_{14}$ | 0.2 | 3.2 | 2.2 |
| Unidentified (Aliphatics) | 2.1 | — | — |
| Total Carbocyclic Compound mixture content | 84.8 | 72.6 | 55.9 |
| ASTM Boil Range, °F. (ASTM D-86) | | | |
| Initial boiling point | 283 | 315 | 307 |
| 10% | 318 | 333 | 320 |
| 50% | 329 | 343 | 342 |
| 90% | 348 | 367 | 401 |
| End point | 364 | 402 | 411 |
| Residue | 1.0 | — | — |
| Specific Gravity | 0.952 | 0.933 | 0.909 |

L6 Footnotes for Table I L6 [1]This styrene compound is selected from the group consisting of ethyl-styrene and dimethylstyrene. L6 [2]Available commercially from the Gulf Oil Company as "Resin Former Feed Stock". L6 [3]Available commercially from the Monsanto Company under the trade designation "Resin Oil". L6 [4]Available commercially from Enjay Company under the trade designation "Heart Cut LPD".

By the term "dicylopentadiene" reference is had o a molecule having the structure:

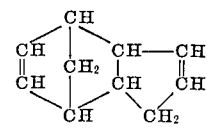

By the phase "when in a form substantially free of other materials" reference is had to a mixture (e.g. of starting materials, of products, or the like, as the case may be) which is substantially free (e.g. on an analytical or a theoretical basis) of substances (like inerts) other than such mixture itself. For example, in Table I above, the carbocyclic compound mixtures are composed of indenes, vinylidene aromatics, and dicyclopentadienes as well as inert diluents, such as "alkyl aromatics," "naphthalenes" and "unidentified aliphatics", but each contains a combination (on a 100 weight percent basis in a form substantially free of other materials) of components (indenes, dicyclopentadiene, and vinylidene aromatics) as described above.

To react phenol with such an aforedescribed carbocyclic compound mixture, it is convenient to use Friedel-Crafts conditions, as indicated The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. In the practice of this invention, the phenol and suitable Friedel-Crafts acid catalyst are mixed, brought to the proper temperature, and the carbocyclic compound mixture metered into the acidified (or catalyzed) phenol.

For purposes of this invention, the reaction of carbocyclic compound mixture with phenol is preferably carried out at temperatures in the range of from about 25° to 200°C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70° and 140°C. The progress of the reaction can be monitored, if desired, by measuring the quantity remaining of unreacted carbocyclic compound mixture using, for example, vapor phase chromotography.

Friedel-Crafts catalysts which may be used in place of aluminum chloride, or together with aluminum chloride, include:

A. other inorganic halides, such as gallium, titanium, antimony and zinc halides (including $ZnCl_2$);
B. inorganic acids such as sulphuric, phosphoric and the hydrogen halides (including HF);
C. activated clays, silica gel and alumina;
D. $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid and the like, or with inorganic acids, such as phosphoric acid, sulfuric acid, and the like, and
E. alkyl, aryl and aralkyl sulfonic acids, such as ethanesulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, β-naphthalene sulfonic acid, 1-naphthol-4-sulfonic acid, and the like.

When $BF_3$, as such, is employed, it is conveniently fed to a reaction mixture in gaseous form.

While any combination of carbocyclic compound starting mixture, phenol, and catalyst can be used, it is particularly convenient to react phenol with carbocyclic compound mixture in the presence of less than about 10 weight percent (based on the starting phenol) of acid catalyst Typically, from about 0.1 to 1 weight percent of Friedel-Crafts acid catalyst is employed (based on phenol).

The reaction mass is heated to a temperature in the range of from about 25° to 200° C. The rate of this reaction is dependent to some degree on the temperature employed. In general, the reaction is rapid, and a complete reaction between phenol and carbocyclic compound mixture is preferred. Generally, a total heating time of from about 10 minutes to 4 hours is employed. The various process variables are summarized in Table II below.

TABLE II

| Process Variable | Broad Range | Preferred Range |
| --- | --- | --- |
| Temperature (°C.) | about 25 to 200°C. | about 40 to 125°C. |
| Reaction time | about 4 hours | about 10 to 30 min. |
| Catalyst (based on phenol) | less than about 10 weight percent | about 0.1 to 1.0 weight percent |
| Inert hydrocarbon diluent (based on total weight carbocyclic mixture and diluent) | up to about 75 weight percent | about 20 to 35 weight percent |
| Total carbocyclic mixture[1] (based on 100 parts by weight phenol, | about 10 to 80 parts by weight | about 15 to 55 parts by weight |

L6 [1]On a 100 weight percent basis when in a form substantially free of other materials.

The properties of a given so-substituted phenol product are affected by the process conditions used to make that product e.g. molecular weight distribution, color, and the like). The resulting reaction product is, as those skilled in the art will appreciate, a complex mixture of various different substituted phenols produced from the reaction of phenol under Friedel-Crafts conditions with the carbocyclic compound starting mixture to produce phenol molecules which are substituted both on ring carbon atoms and on phenol hydroxyl oxygen atoms by moieties derived from such carbocyclic compound.

A substituted carbocyclic compound phenol product can be prepared in a form substantially free of starting materials by conventional distillation separation techniques (e.g. steam distillation, vacuum stripping, and the like), as those skilled in the art will appreciate, but in making resoles for use in this invention, such product can be used directly as made.

In general, to produce a resole for use in this invention, a substituted phenol product, as just described, is neutralized under aqueous liquid phase conditions as by the addition of base (ammonium hydroxide and/or amine), and then from about 0.8 to 2.0 mols of formaldehyde per 1 mol of phenol (preferably from about 1.0 to 1.5 mols formaldehyde per mol of phenol) is mixed with the substituted phenol product (now itself a starting material). Water may be added with the formaldehyde. Formalin is preferred as a source for formaldehyde. Also, a basic catalyst material, such as ammonium hydroxide and/or amine selected from the group consisting of primary amines (such as ethylamine, isobutylamine, ethanol amine, cyclohexylamine, and the like); secondary amines (such as diethanol amine, piperidine, morpholine, and the like); and tertiary amines (such as hexamethylene tetramine, triethylamine, triethanolamine, diethyl cyclohexyl amine, triisobutyl amine; and the like) is introduced into the reaction mixture. Preferred amine catalysts have molecular weights below about 300 and more preferably below about 200. The amine catalyst may include hydroxyl groups which tend to promote solubility of the amine in the reaction mixture. This basic catalyst itself thus can be used to neutralize the starting substituted phenol. The pH of this reaction mixture is maintained from (7.0 and preferably above about 7.5) but below about 8.5. This reaction mixture is then heated to temperatures of from about 60° to 100°C. for a time sufficient to substantially react most of the formaldehyde and thereby produce a desired resole product. Times of from about 20 to 140 minutes are typical. Aqueous liquid phase preparation conditions are used.

It will be appreciated that the formaldehyde to phenol mol ratios herein described have reference to the total amount of phenol present before a reaction, including the phenol which is substituted by the carbocyclic compound mixture, as described above.

To optimize electrical properties in resoles used in this invention, it is preferred to use as a basic catalyst, when reacting such substituted phenols with formaldehyde to make resole resins, one which is non-ionic and non-metallic in character.

The resole product produced by reacting the substituted phenol with formaldehyde as described above is one composed of methylolated substituted phenol which has been methylolated by the formaldehyde to a desired methylol content and optionally advanced (e.g. the molecular weight of the methylolated substituted phenol increased) as by heating as necessary or desirable to make a resole resin product having molecular weight characteristics as above indicated. As those skilled in the art fully appreciate, the methylol content and the degree of advancement are readily controllable, so that one can optimize such a resole resin for use in a particular application. For purposes of this invention, a phenol-formaldehyde resole resin or resole can be regarded as being the reaction product of the above-described substituted phenol mixture and formaldehyde under the aqueous base catalyzed conditions as described herein which product can be thermoset by heat alone without the use of a curing catalyst.

In general, such a resole product as made is a brown colored, unstable, multiphase aqueous emulsion whose viscosity depends, in any given instance, upon process and reactant variables, but which usually ranges from a syrupy liquid to a semi-solid state. Such a resole product usually separates from such aqueous phase as a brown colored material whose viscosity varies from a syrup to a solid.

To make a resole resin varnish of this invention such as an emulsion is dehydrated, preferably under heat and reduced pressure, to a water content of from about 0.5 to 15 weight percent (based on total resole weight). When the resulting water content is over about 2 weight percent, there is produced a simple-phased, clear dark-colored high solids, resole resin. In any given instance, its total solids content, (residual) water content, and viscosity depend upon the amount of substituted phenol aldehyde product present, the mol ratio of formaldehyde to substituted phenol, specific type and amount of methylolation catalyst, conditions and reactants used to substitute the phenol, methylolation temperature, degree of advancement, and the like.

When such a dehydrated liquid resole is further dehydrated to a water content under about 2 weight percent, there is produced a solid, so-called "one-stage lump resin", which consists substantially of pure resin. Following such dehydration, and, typically, cooling, this solid resin can be broken up or ground into a solid resin having a convenient particle size range. Since this one-stage lump resin is heat reactive by itself, it is convenient and preferred to cool it during and towards the end of dehydration so as to slow reaction with itself and thereby prevent gelation. This material is characteristically a dark solid, having a softening point somewhere in the range of from about 25° to 100°C. or even higher.

After such dehydration, the resulting resole resin is then dissolved in a relatively volatile, inert organic solvent medium having properties as defined above. It is not necessary, and it is preferred not, to prepare the resole resin in the form of a one-stage lump before dissolution thereof in such organic solvent.

While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl ketone). The term "lower" refers to less than seven carbon atoms per molecule as used herein. Aromatic and aliphatic (including cycloaliphatic) hydrocarbons can also be employed as solvents for a given resin, including benzene, toluene, xylene, naphthalene, nonone, octane, petroleum fractions, etc. Preferably, the total water content of a varnish of the invention is below about 10 weight percent, and more preferably falls in the range of from about 0.5 to 5 weight percent.

Those skilled in the art will appreciate that care should preferably be taken to use an organic liquid system in which the phenolic resole resins are completely soluble as well as any water present. Adding, for example, a ketone or an ether-ester solvent like butyl cellosolve will generally improve the water tolerance (ability to dissolve water) of a solvent system.

These varnishes are characteristically dark colored, one-phase, clear liquid solutions, each having a viscosity ranging from about 5 to 5,000 centipoises. The exact viscosity of a given varnish depends upon many chemical process and product variables. For impregnating applications, viscosities of from about 50 to 500 centipoises are preferred.

The total solids content of a given varnish product can be as high as about 85 weight percent or even higher, and as low as about 20 weight percent or even lower, but preferred solids contents usually fall in the range of from about 25 to 65 weight percent. As those skilled in the art will appreciate, the varnishes of this invention can be advanced (e.g. crosslinked as by heating to produce larger molecules) to a greater extent without forming precipitates from the organic solvent phase than is the case of corresponding aqueous resole products.

When used for impregnation and reinforcing purposes, the liquid resole resin varnishes of this invention are useful for impregnating cellulosic paper, asbestos paper, and other non-woven sheet structures as well as woven fabrics (cotton, glass fibers, nylon, etc.), etc. Impregnation can be accomplished by any convenient means, including dipping, coating, spraying, mixing, or the like. The so-impregnated material is dried to lower the volatiles content and then heated to advance the resin to the proper degree for the intended use. The resole varnishes of this invention are useful in the preparation of laminates, such as those made from such impregnated sheet materials. Such laminates are used in electrical applications as supports or as insulation for conductive elements. The laminates are generally manufactured in a sheet or block form which is then punched or otherwise machined to provide desired configurations for a particular end use.

The resole varnishes of this invention are also useful in the manufacture of cloth laminates, and automotive oil filters. A suitable oil filter media, for example, is prepared by impregnating with a varnish of this invention, cellulosic fiber paper modified with a synthetic fiber (polyester, or the like) and having a thickness of from about 5 to 20 mils. Sufficient resole varnish resin of this invention is used to obtain an impregnated sheet member having a cured resin content of about 15 to 25 percent, based on the weight of the paper. After such paper is so impregnated, it is heated to advance the resin to a so-called B-stage, and then is corrugated or pleated to form the filter element. The filter element is then assembled with the end use filter container and heated to 250° to 350°F. for from 5 to 20 minutes to cure the resin. When cured, the product has good flexibility and low tendency to crack during use.

In general, a varnish of the present invention can be used to make reinforced plastics.

In a more preferred embodiment of the present invention, an organic solution or varnish contains from about 55 to 65 weight percent (total solution basis) of the dissolved phenolic resin. In such a more preferred solution, there are from about 2 to 12 parts of dissolved water (total solution basis). In this invention, all solids are conveniently measured using the ASTM Test Procedure D-115-55.

Also in such a preferred embodiment, the substituted phenol used in making phenolic resin is made using a carbocyclic compound mixture in which there are from about 20 through 40 weight percent of compounds having the indene nucleus (as above described), from about 15 through 30 weight percent of compounds having the dicyclopentadiene nucleus (as above described) and from about 30 through 65 weight percent of compounds having a phenyl group and a vinylidene group (as above described), the percentage of divinyl benzene in such preferred carbocyclic compound mixture being as described above, and there being a total of 100 weight percent of these three components in a given such carbocyclic compound mixture when such is in a form substantially free of other materials.

The term "vinylidene" as used herein has generic reference both to vinylidene radicals ($CH_2 = C$ ), and vinyl radicals ($CH_2 = CH—$ or $—CH = CH—$); observe that in carbocyclic compound mixtures used in this invention having a phenyl group substituted by a vinylidene group, alpha-methyl substitution is included in this definition, as well as styrene, methyl styrene, and ethyl styrene.

When dehydrating a resole resin made from a substituted phenol as described above and formaldehyde, convenient reduced pressures range from about 5 to 10 psia to an end temperature of about 60° to 90°C. though those skilled in the art will appreciate that lower and higher such pressures and temperatures can be used without departing from the spirit and scope of this invention.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all arts and percentages are on a weight basis.

EXAMPLE 1

Charge 100 parts of phenol and 1 part of concentrated sulphuric acid to a suitable reaction vessel and heat the mixture to 50° C. Add 70 parts of a carbocyclic compound mixture available commercially under the trade designation "Resin Oil" from Monsanto Company, having a composition as given above to the starting mixture while keeping the temperature stable at 50°C. Hold the temperature of the mixture at 50°C. after addition of such carbocyclic compound mixture for 1 hour and then add 7.5 cc. of 28 percent $NH_4OH$ thereto to neutralize the acid catalyst. To the neutralized reaction mixture, add 2 parts of triethylamine and 60 parts of 50 percent formalin (50–50 formaldehyde-water). Now heat the reaction mixture to a reflux at 100° C. and continue refluxing for 4 hours. Then cool the reaction mixture and remove volatile material under a vacuum of 28 inches of mercury until the temperature of the mixture rises to 80°C. Then add 50 parts of methanol and 10 parts of acetone to form a solution having 71.5 percent solids (measured by heating 1½ grams of resin for 3 hours at 135°C.), an Ostwald viscosity of 4,582 centipoises at 25°C., pH of 8.42 and a water content of 1.76 percent.

EXAMPLE 2

Charge 100 parts of phenol and 0.1 part of $BF_3$ to a suitable reaction vessel and heat the mixture to 50°C. Add 30 parts of the carbocyclic compound mixture used in Example 1 to the mixture gradually over a period of 30 minutes. Hold the temperature of the mixture at 50°C. after addition of the carbocyclic compound mixture for 1 hour and then add 7.5 parts of 28 percent $NH_4OH$ to neutralize the acid catalyst. Then add 2 parts of triethylamine and 60 parts of 50 percent formalin to the neutralized mixture. Now heat the reaction mixture to a reflux at 100°C. and continue refluxing for 2 hours. Cool the mixture and remove volatile material (mainly water) under a vacuum of 28 inches of mercury until the temperature of the mixture rises to 80°C. Then add 50 parts of methanol to form a solution having a solids content of 68.5 percent and a pH of 8.62.

EXAMPLE 3

Charge 100 parts of phenol and 1 part of concentrated sulphuric acid to a suitable reaction vessel. Add 50 parts of the carbocyclic compound mixture used in Example 1 to the mixture gradually over a period of 30 minutes. The temperature of the reaction mixture rises due to the exothermic reaction. Hold the temperature of the reaction mixture at 75°C. for 30 minutes and then add 7.5 parts of 28 percent $NH_4OH$ to neutralize the acid catalyst. Then add 2 parts of triethylamine and 60 parts of 50 percent formalin to the neutralized mixture. Now heat the mixture to a reflux at 100°C. and continue heating the mixture for 2 hours. Cool the mixture and remove volatile material under a vacuum of 28 inches of mercury until the temperature of the mixture rises to 80°C. Then add 60 parts of methanol to form a solution having a solids content of 68.5 percent and a pH of 8.62.

EXAMPLE 4

A test laminate is prepared from the resin solution of Example 1 and 10 mil electrical grade cotton linters paper which has been pre-impregnated to a 15 percent resin content with a low molecular weight liquid phenol-formaldehyde resin. This resin is made as follows: Phenol (100 parts), 50 percent formalin (111 parts) and triethylamine (5 parts) is charged to a vessel. After reacting at 70° C. until the mixture's free formaldehyde content is less than 4 percent, the mixture is cooled. About 55 percent solids is obtained.

Eight plies of the so-pre-impregnated paper are then impregnated to a total resin content of 62 percent with the resin solution of Example 1. The impregnated papers are dried for 19 minutes at 135°C. The 8 plies of dried impregnated paper are assembled into a deck and cured for 30 minutes at 160°C. under a pressure of 1,000 psi to form a laminate about one-sixteenth inch thick.

Various properties of the laminates along with, for comparison purposes, the National Electrical Manufacturers Association (NEMA) specifications thereof for XXXP type laminates are given below in Table III.

TABLE III

| | NEMA XXXP | Laminate |
|---|---|---|
| Water Absorption, % | 1.0 | 0.33 |
| Dielectric Constant (ASTM D-150-54T) | | |
| at $10^6$ cps A | 4.6 | 4.25 |
| at $10^6$ cps D 24/23 | 4.8 | 4.34 |
| Dissipation Factor (ASTM D-150-54T) | | |
| at $10^6$ cps A | .035 | .031 |
| at $10^6$ D 24/23 | .035 | .032 |

The electrical properties of the resins of this invention are well below the maximum NEMA specifications for XXXP type laminates.

EXAMPLES 5 THROUGH 31

The following Examples are presented in tabular form for brevity. The process in all instances is as shown in Example 1 except that the indicated variables are altered as shown in Table IV below in each respective instance.

This intermediate product in each example is reacted with formaldehyde in the manner as taught in Example 1 to produce first an aqueous resole emulsion product which is then treated in the same manner as taught in Example 1 to reproduce a resole varnish.

TABLE IV

| Example Number | Phenol | Catalyst Type | Catalyst Amount | Carbocyclic compound mixture Type | Carbocyclic compound mixture Amount | Temperature, °C. | Post reaction time, minutes |
|---|---|---|---|---|---|---|---|
| 5 | 100 | 1 | 1.0 | A | 50 | 50 | 15 |
| 6 | 100 | 2 | 0.1 | A | 30 | 50 | 15 |
| 7 | 100 | 1 | 1.0 | A | 50 | 75 | 15 |
| 8 | 100 | 2 | 1.0 | A | 70 | 50 | 15 |
| 9 | 100 | 3 | 0.5 | A | 30 | 65 | 15 |
| 10 | 100 | 1 | 0.3 | A | 70 | 100 | 15 |
| 11 | 100 | 1 | 1.0 | A | 30 | 100 | 15 |
| 12 | 100 | 1 | 0.3 | A | 80 | 75 | 15 |
| 13 | 100 | 1 | 0.3 | B | 90 | 75 | 45 |
| 14 | 100 | 1 | 0.3 | B | 30 | 75 | 15 |
| 15 | 100 | 4 | 1.0 | B | 50 | 100 | 30 |
| 16 | 100 | 2 | 0.5 | B | 70 | 50 | 15 |
| 17 | 100 | 1 | 0.3 | A | 30 | 75 | 15 |
| 18 | 100 | 1 | 0.3 | A | 70 | 75 | 15 |
| 19 | 100 | 1 | 0.3 | C | 50 | 75 | 15 |
| 20 | 100 | 1 | 0.3 | D | 50 | 75 | 60 |
| 21 | 100 | 2 | 0.5 | C | 90 | 75 | 15 |
| 22 | 100 | 4 | 0.5 | C | 90 | 75 | 15 |
| 23 | 100 | 1 | 0.3 | C | 125 | 85 | 15 |
| 24 | 100 | 1 | 0.3 | C | 50 | 50 | 45 |
| 25 | 100 | 1 | 0.3 | C | 30 | 40 | 240 |
| 26 | 100 | 3 | 1.0 | D | 50 | 75 | 15 |
| 27 | 100 | 2 | 0.5 | D | 30 | 75 | 15 |
| 28 | 100 | 1 | 1.0 | D | 5 | 75 | 15 |
| 29 | 100 | 1 | 0.3 | D | 40 | 50 | 120 |
| 30 | 100 | 1 | 0.3 | D | 25 | 80 | 15 |
| 31 | 100 | 1 | 0.3 | D | 10 | 40 | 15 |

The numbers listed under "Type Catalyst" designate specific Friedel-Crafts catalysts as follows:

1 — $H_2SO_4$
2 — $BF_3$.diethyl ether
3 — p-toluene sulfonic acid
4 — $AlCl_3$

The letters listed under "Type Carbocyclic Mixture" each designate a specific carbocyclic composition as follows:

| | A | B | C | D |
|---|---|---|---|---|
| styrene | 1–2 | 10.1 | 1 | 10 |
| alpha-methyl styrene | 1–3 | 2.2 | 2 | 2 |
| beta-methyl styrene | 1–3 | 2.1 | 2 | 2 |
| vinyl toluene | 14–21 | 10.5 | 10 | 25 |
| $C_2$ alkyl styrene | 4–7 | 5.8 | 4 | 4 |

| | | | | |
|---|---|---|---|---|
| divinyl benzene | 1–2 | 1.6 | 1 | 1 |
| indene | 15–22 | 12.7 | 10 | 25 |
| methyl indene | 4–7 | 7.6 | 5 | 5 |
| dicyclopentadiene | 12–18 | 1.1 | 5 | 25 |
| methylcyclopentadiene | 4–6 | 2.1 | 1 | 1 |
| inert diluent | 25–35 | 44.2 | 59 | 0 |

The columns designated, respectively, "Phenol", "Amount Carbocyclic Compound Mixture", and "Amount Catalyst" are in terms of parts by weight.

EXAMPLE 32

Charge 100 parts of phenol and 0.3 part of concentrated sulphuric acid to a suitable reaction vessel and heat the mixture to 70°C. Add 70 parts of carbocyclic compound mixture used in Example 1 to the mixture over a period of 45 minutes while keeping the temperature at 70°–80°C. Hold the temperature of the mixture at 70°–80°C. after addition of the carbocyclic compound mixture for 15 minutes. Then add 3 parts of hexamethylene tetramine, 2 parts of triethylamine and 60 parts of 50 percent formalin (50–50 formaldehyde-water) to the reaction mixture. Now heat the reaction mixture to atmospheric reflux at 100°C. and continue refluxing for 2.5 hours. Then cool and remove volatile material under a vacuum of 25.5 inches of mercury until the temperature of the mixture reaches 60°C. Then add 87 parts of methanol to form a solution having 59.3 percent solids (measured by heating 1.5 grams of resin for 3 hours at 135°C.) and an Ostward viscosity of 137 centipoises at 25°C.

EXAMPLE 33

Charge 100 parts of phenol and 1 part of concentrated sulphuric acid to a suitable reaction vessel and heat the mixture to 50°C. Add 50 parts of carbocyclic compound mixture used in Example 1 to the mixture over a period of 30 minutes while keeping the temperature stable at 50°C. After addition of the carbocyclic compound mixture, add 7.5 cc. of 28% $NH_4OH$ to neutralize the acid catalyst. To the neutralized reaction mixture add 2 parts of triethylamine and 60 parts of 50 percent formalin (50–50 formaldehyde-water). Now heat the reaction mixture to a reflux at 100°C. and continue refluxing for 1½ hours. Then cool the reaction mixture and remove volatile material under a vacuum of 28 inches of mercury until a temperature of 80°C. is reached. Then add 50 parts of methanol to the reaction mixture.

EXAMPLE 34

Charge 100 parts of phenol and 1 part of concentrated sulphuric acid to a suitable reaction vessel and heat the mixture to 50°C. Add 70 parts of carbocyclic compound mixture used in Example 1 to the mixture over a period of 30 minutes while keeping the temperature stable at 50°C. After addition of the carbocyclic compound mixture, add 7.5 cc. of 28% $NH_4OH$ thereto to neutralize the acid catalyst. To the neutralized reaction mixture add 2 parts of triethylamine and 60 parts of 50 percent formalin (50–50 formaldehyde-water). Now heat the reaction mixture to a reflux at 100°C. and continue refluxing for 2 hours. Then cool the reaction mixture and remove volatile material under a vacuum of 27 inches of mercury until a temperature of 80°C. is reached. Then add 50 parts of methanol to the reaction mixture.

EXAMPLE 35—PART A

Four test laminates are prepared from the resin solutions of Examples 1, 32–34 and 10 mil electrical grade cotton linters paper which has been pre-impregnated to a 15 percent resin content with a commercially-available, low molecular weight liquid phenol-formaldehyde resin.

Each laminate is prepared by impregnating 8 plies of the pre-impregnated paper to a total resin content of about 60 percent with one of the resin solutions of Examples 1, 32–34. The impregnated papers are dried at 135°C. until proper laminating flow is attained. The 8 plies of dried impregnated paper are assembled and cured for 30 minutes to 160°C. under a pressure of 1,000 psi to form a laminate about one-sixteenth inch thick.

PART B

Part A is repeated except that an electrical grade phenolic resin modified with cresol is used.

PART C

Part A is repeated except that an unmodified phenol-formaldehyde resin prepared by heating 100 parts of phenol in the presence of 1 part $BF_3$ at 50°C. for 1.5 hours and then adding 60 parts of 50 percent formalin in the presence of 7.5 cc. of 28% $NH_4OH$ and 2 parts of triethylamine under reflux at 100°C. for 20 minutes, is employed in place of the commercial electrical grade cresol-based resin.

Various properties of the test laminates prepared above along with the National Electrical Manufacturers Association specification for XXXP laminates, are given in Table V.

TABLE V

| Laminate | % Water Absorption | Dielectric Constant[1] A D24/23 | | Dissipation Factor[1] A D24/23 | | Insulation Resistance[1] A c96/35/90 | |
|---|---|---|---|---|---|---|---|
| Part A Ex. 1 Resin | 0.33 | 4.25 | 4.34 | .031 | .032 | $1.2×10^7$ | $1.1×10^5$ |
| Ex. 32 Resin | 0.32 | 4.71 | 4.75 | .031 | .031 | $4.9×10^6$ | $2.7×10^4$ |
| Ex. 33 Resin | 0.42 | 4.5 | 4.6 | .033 | .034 | $8.6×10^6$ | $4.9×10^4$ |
| Ex. 34 Resin | 0.59 | 4.35 | 4.4 | .032 | .033 | $1.8×10^7$ | $1.3×10^5$ |
| Part B | 0.43 | 4.70 | 4.91 | .040 | .042 | $6.9×10^6$ | $2.2×10^3$ |
| Part C | 1.34 | 5.4 | 5.9 | .046 | .051 | $1.3×10^6$ | $1.4×10^3$ |
| NEMA XXXP | 1.00 | 4.6 | 4.8 | .035 | .035 | — | — |

L6 [1]ASTM TEST D-150-54T

The above data show improvements in electrical properties of modified phenolic resins made in accordance with this invention over those of a cresol modified electrical grade phenolic resin or a standard phenol-based resin. Furthermore, the electrical properties of the resins of this invention are well below the maximum NEMA specifications for XXXP type laminates.

EXAMPLE 36

Charge 100 parts of phenol and 0.3 parts concentrated sulfuric acid to a suitable reaction vessel and heat to 70°C. Add 70 parts of carbocyclic compound mixture used in Example 1 to the mixture over a period of 45 minutes while keeping the temperature at 70°–80 °C. Hold the temperature of the mixture at 70°–80°C. after addition of the carbocyclic compound mixture for 15 minutes; then add 3 parts of hexamethylenetetraethylamine, 2 parts of triethylamine and 60 parts of 50 percent formalin to the reaction mixture. Now heat the reaction mixture to atmospheric reflux at 100°C. and continue the refluxing for 1.5 hours. Then cool and remove volatile material under a vacuum of mercury until the temperature of the mixture reaches 60°C. Then add a 92/8 mixture of ethanol/toluene to form a solution having 66 percent solids.

EXAMPLE 37

Two sheets of cellulose fiber paper containing 12 percent of a synthetic fiber (polyester) and having a thickness of 10 mils are separately impregnated with the varnish of Example 36. The impregnated sheets are heated to B-stage the resin and reduce the volatiles to from 4 to 10 percent. The filters are cured for about 15 minutes at about 300°F. The following Table VI data shows good strength yet good flexibility in oil filter paper impregnated with a varnish of this invention.

TABLE VI

| Varnish | Cured Resin Content % Volatiles | Green Tensile Strength Lbs./In[1] | No. of 180° Flexes to rupture[2] |
| --- | --- | --- | --- |
| Example 36 | 20.3/8.5 | 19.0 | 190 |

L6 [1]The force required to break 1″ wide strips of the impregnated paper at B-stage. L6 [2]After 2 hours conditioning in 300°F. oil.

EXAMPLE 38

Charge 100 parts of phenol and 0.3 parts concentrated sulfuric acid to a suitable reaction vessel and heat to 70°C. Add 70 parts of carbocyclic compound mixture used in Example 1 to the mixture over a period of 45 minutes while keeping the temperature at 70°–80 °C. Hold the temperature of the mixture at 70°–80°C. after addition of the carbocyclic compound mixture for 15 minutes; then, add 2 parts of diethanolamine and 3 parts ethanolamine and 60 parts of 50 percent formalin to the reaction mixture. Now heat the reaction mixture to atmospheric reflux at 100°C. and continue the refluxing for 1.5 hours. Then cool and remove volatile material under a vacuum of mercury until the temperature of the mixture reaches 60°C. Then, add a 92/8 mixture of ethanol/toluene to form a solution having 66 percent solids.

In each of the foregoing Examples 1–38 whenever a liquid aqueous resole resin is made from a substituted phenol and aldehyde in accordance with the teachings of this invention there is produced first an aqueous emulsion containing water and methylolated substituted phenol plus some advanced methylolated materials. When this material is dehydrated by heating under vacuum (the temperature being about 60° to 80°C. and the vacuum pressure being about 22 to 28 mm Hg) there is produced when the residue contains less than about 20 weight percent of water a high solid, viscous, dark colored, single phase fluid which is one of the resole products of this invention.

When this fluid is further dehydrated under similar conditions with a water content of about 2 weight percent, there is produced a solid one-stage lump resin.

When the afore-indicated emulsion is dehydrated under the afore-indicated heat and temperature reduced pressures, the phenol-aldehyde resin is first reduced to a water content under about 20 weight percent and is thereafter dissolved in, respectively, methanol and ethanol to produce resole varnishes of the present invention.

What is claimed is:

1. A varnish adapted for use in the manufacture of reinforced plastics comprising:
  A. from about 20 to 85 weight percent (total solution basis) of a dissolved phenol-formaldehyde resole resin;
  B. from about 0.5 to 15 weight percent (total solution basis) of dissolved water;
  C. the balance up to 100 weight percent (total solution basis) of any given solution being substantially an organic liquid which:
   1. is substantially inert,
   2. boils below about 150° C. at atmospheric pressure,
   3. is a mutual solvent for said resole resin and for said water;
  D. said resole resin being characterized by:
   1. having a formaldehyde to phenol mol ratio of from about 0.8 to 2.0,
   2. being substantially insoluble in water but having a viscosity in methanol solution at 60 weight percent resin solids concentration of not greater than about 5,000 centipoises, and
   3. having a free-formaldehyde content which is less than about 5 weight percent;
  E. said substituted phenol mixture having been prepared by gradually adding a mixture of carbocyclic compounds to a preheated liquid phase mixture of phenol and Friedel-Crafts acid catalyst maintained in the range from about 25° to 200° C. whereby over a time interval of from about 10 minutes to four hours from about 10 to 80 parts by weight of said mixture of carbocyclic compounds reacts with each 100 parts by weight of phenol;
  F. said mixture of carbocyclic compounds comprising (on a 100 weight percent basis when in a form substantially free of other materials):
   1. from 10 to 40 weight percent (total mixture basis) of compounds each molecule of which has:
    a. the indene nucleus,
    b. from nine to 13 carbon atoms,
    c. as nuclear substituents from 0 to 4 methyl groups;
   2. from 5 to 70 weight percent (total mixture basis) of compounds each molecule of which has:
    a. the dicyclopentadiene nucleus,
    b. from 10 to 13 carbon atoms,
    c. as nuclear substituents from 0 to 3 methyl groups;
   3. from 15 to 65 weight percent (total mixture basis) of compounds each molecule of which has:
    a. a phenyl group substituted by a vinylidene group,
    b. from eight to 13 carbon atoms,
    c. as substituents from 0 to 3 groups selected from the class consisting of methyl and ethyl;
4. from 0 to 5 weight percent divinyl benzene;
5. wherein the sum total of all such compounds in any given such mixture of carbocyclic compounds is always 100 weight percent;
G. said resole resin having been prepared by first reacting said substituted phenol mixture and said formaldehyde in the presence of a basic catalyst selected from the group consisting of ammonium hydroxide, and organic amines while maintaining a pH in the range from 7 to about 8.5 and thereafter dehydrating the resulting aqueous emulsion to a water content of from about 0.5 to 15 weight percent.

2. The varnish of claim 1 wherein said carbocyclic compound mixture comprises:
A. from 20 to 40 weight percent (total mixture basis) of compounds each molecule of which has:
1. the indene nucleus,
2. from nine to 13 carbon atoms,
3. as nuclear substituents from 0 to 4 methyl groups;
B. from 15 to 30 weight percent (total mixture basis) of compounds each molecule of which has:
1. the dicyclopentadiene nucleus,
2. from 10 to 13 carbon atoms,
3. as nuclear substituents from 0 to 3 methyl groups;
C. from 30 to 65 weight percent (total mixture basis) of compounds each molecule of which has:
1. a phenyl group substituted by a vinylidene group,
2. from eight to 13 carbon atoms,
3. as substituents from 0 to 3 groups selected from the class consisting of methyl and ethyl;
D. from 0 to 5 weight percent divinyl benzene;
E. wherein the sum total of all such compounds in any given such mixture of carbocyclic compounds is always 100 weight percent.

3. The product of claim 1 made from the reaction product of phenol and said mixture of carboxyclic compounds in the presence of an inert hydrocarbon such that, of the combined weight of said mixture of carbocyclic compound and said inert hydrocarbon, the inert hydrocarbon portion thereof ranges from about 15 to 70 weight percent thereof.

4. The product of claim 1 made from the reaction product of phenol and said mixture of carbocyclic compounds in the presence of an inert hydrocarbon such that, of the combined weight of said mixture of carbocyclic compound and said inert hydrocarbon, the inert hydrocarbon portion thereof ranges from about 20 to 35 weight percent thereof.

5. The product of claim 1, wherein the basic catalyst is selected from the group consisting of the lower primary, secondary and tertiary amines of molecular weight below 300.

6. The product of claim 1, made from the reaction product of between 15 and 55 parts by weight of carbocyclic compound and 100 parts by weight of phenol.

7. The product of claim 1, wherein the mixture of carbocyclic compounds has a boiling range from 280° to 420° F.

8. A varnish adapted for use in the manufacture of reinforced plastics comprising:
A. from about 20 to 85 weight percent (total solution basis) of a dissolved phenol-formaldehyde resole resin;
B. from about 0.5 to 15 weight percent (total solution basis) of dissolved water;
C. the balance up to 100 weight percent (total solution basis) of any given solution being substantially an organic liquid which:
1. is substantially inert,
2. boils below about 150° C. at atmospheric pressure,
3. is a mutual solvent for said resole resin and for said water;
D. said resole resin being characterized by:
1. having a formaldehyde to phenol mol ratio of from about 0.8 to 2.0,
2. being substantially insoluble in water but having a viscosity in methanol solution at 60 weight percent resin solids concentration of not greater than about 500 centipoises, and
3. having a free-formaldehyde content which is less than about 5 weight percent;
E. said substituted phenol mixture having been prepared by gradually adding a mixture of carbocyclic compounds to molten phenol containing between 0.1 and 1 percent of a Friedel-Crafts acid catalyst maintained at a temperature in the range from 40° to 125° C. whereby over a time interval of from about 10 minutes to four hours from about 15 to 55 parts by weight of said mixture of carbocyclic compounds reacts with each 100 parts by weight of phenol;
F. said mixture of carbocyclic compounds comprising (on a 100 weight percent basis when in a form substantially free of other materials):
1. from 20 to 40 weight percent (total mixture basis) of compounds each molecule of which has:
a. the indene nucleus,
b. from nine to 13 carbon atoms,
c. as nuclear substituents from 0 to 4 methyl groups;
2. from 15 to 30 weight percent (total mixture basis) of compounds each molecule of which has:
a. the dicyclopentadiene nucleus,
b. from 10 to 13 carbon atoms,
c. as nuclear substituents from 0 to 3 methyl groups;
3. from 30 to 65 weight percent (total mixture basis) of compounds each molecule of which has:
a. a phenyl group substituted by a vinylidene group,
b. from eight to 13 carbon atoms,
c. as substituents from 0 to 3 groups selected from the class consisting of methyl and ethyl;
4. from 0 to 5 weight percent divinyl benzene;
5. wherein the sum total of all such compounds is any given such mixture of carbocyclic compounds is always 100 weight percent;
G. said resole resin having been prepared by first reacting said substituted phenol mixture and said formaldehyde in the presence of a basic catalyst selected from the group consisting of ammonium hydroxide, hexamethylenetetramine, and tri(lower alkyl) amines while maintaining a pH in the range from 7 to about 8.5 and thereafter dehydrating the resulting aqueous emulsion to a water content of from about 0.5 to 5 weight percent.

9. The product of claim 1, wherein the basic catalyst is selected from the group consisting of ammonium hydroxide, hexamethylenetetramene and triethylamine.

* * * * *